United States Patent
Shen et al.

(10) Patent No.: US 9,768,676 B1
(45) Date of Patent: Sep. 19, 2017

(54) SWITCHING POWER REGULATOR CONTROLLED WITH MIRRORED ERROR CURRENT

(71) Applicant: MICROSOFT TECHNOLOGY LICENSING, LLC, Redmond, WA (US)

(72) Inventors: Wei Shen, Palo Alto, CA (US); Raul A. Perez, San Francisco, CA (US)

(73) Assignee: MICROSOFT TECHNOLOGY LICENSING, LLC, Redmond, WA (US)

( * ) Notice: Subject to any disclaimer, the term of this patent is extended or adjusted under 35 U.S.C. 154(b) by 0 days.

(21) Appl. No.: 15/394,714

(22) Filed: Dec. 29, 2016

(51) Int. Cl.
  *H02M 3/156* (2006.01)
  *H02M 1/00* (2006.01)
  *H02M 3/335* (2006.01)
  *H02M 3/158* (2006.01)

(52) U.S. Cl.
  CPC .......... *H02M 1/00* (2013.01); *H02M 3/156* (2013.01); *H02M 3/33507* (2013.01); *H02M 2001/0009* (2013.01)

(58) Field of Classification Search
  CPC . H02M 2001/0009; H02M 2001/0025; H02M 2001/0029; H02M 2001/0038; H02M 3/156; H02M 2003/1566; H02M 3/158; H02M 3/1588
  See application file for complete search history.

(56) References Cited

U.S. PATENT DOCUMENTS

| 7,170,267 | B1 | 1/2007 | McJimsey |
| 7,498,793 | B2 | 3/2009 | Xu |
| 7,733,671 | B2 * | 6/2010 | Chen ............... H02M 3/158 323/222 |
| 8,018,208 | B1 | 9/2011 | Kahn et al. |
| 8,587,274 | B2 * | 11/2013 | Strydom ............ H02M 3/158 323/282 |
| 8,593,123 | B2 | 11/2013 | Chen et al. |
| 8,786,268 | B2 | 7/2014 | Li et al. |
| 8,884,596 | B2 | 11/2014 | Li et al. |

(Continued)

OTHER PUBLICATIONS

Jeong, et al., "Integrated Current-Mode DC-DC Buck Converter with Low-Power Control Circuit", In Proceedings of Transactions on Electrical and Electronic Materials, vol. 14, No. 5, Oct. 25, 2013, pp. 235-241.

(Continued)

*Primary Examiner* — Gary L Laxton
(74) *Attorney, Agent, or Firm* — Alleman Hall Creasman & Tuttle LLP

(57) ABSTRACT

A power regulator circuit includes an input node, an output node, a power converter, and a control loop. The power converter is operatively intermediate the input node and the output node and includes a switch and an inductor. The control loop is configured to control operation of the power converter to regulate the flow of electrical power from the input node to the output node. The control loop is operatively connected to the switch and the output node. The control loop takes advantage of a mirror of an error current that is based on an output voltage of the output node. The mirror of the error current modifies a sensed inductor current of the inductor during load transients to speed up a transient response of the power converter.

20 Claims, 3 Drawing Sheets

(56) References Cited

U.S. PATENT DOCUMENTS

| | | | |
|---|---|---|---|
| 2011/0241641 A1* | 10/2011 | Chen ................ | H02M 3/1588 |
| | | | 323/284 |
| 2014/0139198 A1 | 5/2014 | Manlove et al. | |
| 2014/0247029 A1* | 9/2014 | Krabbenborg ....... | H02M 3/156 |
| | | | 323/282 |
| 2014/0292288 A1 | 10/2014 | Yan et al. | |

OTHER PUBLICATIONS

Akhamal, et al., "Fast Transient Response Low Dropout Voltage Regulator", In International Journal of Embedded Systems and Applications, vol. 4, No. 2/3, Sep. 2014, pp. 1-10.

Lin, et al. ,"An Active-Frequency Compensation Scheme for CMOS Low-Dropout Regulators with Transient-Response Improvement", In Journal of IEEE Transactions on Circuits and Systems II: Express Briefs, vol. 55, Issue 9, Sep. 2008, pp. 853-857.

Mammano, Robert., "Switching Power Supply Topology Voltage Mode vs. Current Mode", In Unitrode Design Note DN-62, Retrieved on: Jul. 26, 2016, pp. 1-4.

Ridley, Raymond B., "A New, Continuous-Time Model for Current-Mode Control", In Journal of IEEE Transactions on Power Electronics, vol. 6, Issue 2, Apr. 1991, pp. 271-280.

Seago, John, "Opti-Loop architecture reduces output capacitance and improves transient response", In Application Note 76 of Linear Technology Corporation, May 1999, 16 pages.

"Pros and Cons of Using a Feedforward Capacitor with a Low-Dropout Regulator", In Application report SBVA042, Jul. 2014, pp. 1-9.

\* cited by examiner

SWITCHING POWER REGULATOR CONTROLLED WITH MIRRORED ERROR CURRENT

BACKGROUND

Switching power regulator circuits may be used to supply electrical power to a wide variety of electronic components and/or devices. During operation, a switching power regulator circuit may be required to perform precise output voltage regulation even under fast transients of load current levels.

SUMMARY

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter. Furthermore, the claimed subject matter is not limited to implementations that solve any or all disadvantages noted in any part of this disclosure.

A power regulator circuit includes an input node, an output node, a power converter, and a control loop. The power converter is operatively intermediate the input node and the output node and includes a switch and an inductor. The control loop is configured to control operation of the power converter to regulate the flow of electrical power from the input node to the output node. The control loop is operatively connected to the switch and the output node. The control loop takes advantage of a mirror of an error current that is based on an output voltage of the output node. The mirror of the error current modifies a sensed inductor current of the inductor during load transients to speed up a transient response of the power converter.

DETAILED DESCRIPTION

A switching power regulator circuit may include a power converter to regulate a flow of electrical power through the circuit from a certain input voltage to a desired fixed output voltage. As an example, a switching power regulator circuit may include a fixed-frequency, current-mode controlled power converter. This type of power converter advantageously allows a peak inductor current to be controlled throughout operation of the circuit such that an average current through an inductor of the power converter matches a load current. Such continuous current control produces highly regulated stead-state operation such that output voltage ripple is fixed and an instantaneous switch current remains under a designated current limit. Moreover, because the switching frequency is fixed and known from the design of the power converter, frequency noise can be filtered to allow for tight output voltage regulation during steady state conditions. However, during load transients, variances in the output voltage (e.g., voltage ripple/bounce) may occur, which slows a transient response of the switching power regulator circuit.

Accordingly, the present disclosure is directed to a switching power regulator circuit including a fixed-frequency, current-mode controlled power converter having a fast transient response. More particularly, a control loop of the power converter governs a peak inductor current according to a demand of the load. To speed up the transient response of the power converter, a mirror of an error current, which is a difference of the output voltage and a reference voltage of the circuit, is injected into a current sensing amplifier to manipulate a real-time sensed current of the power converter. In other words, the manipulation of the sensed current by the mirror of the error current "tricks" the control loop into providing a faster response by not waiting for the effects of the actual sensed current to flow through the power converter and be fed back through the control loop.

Figure 1:
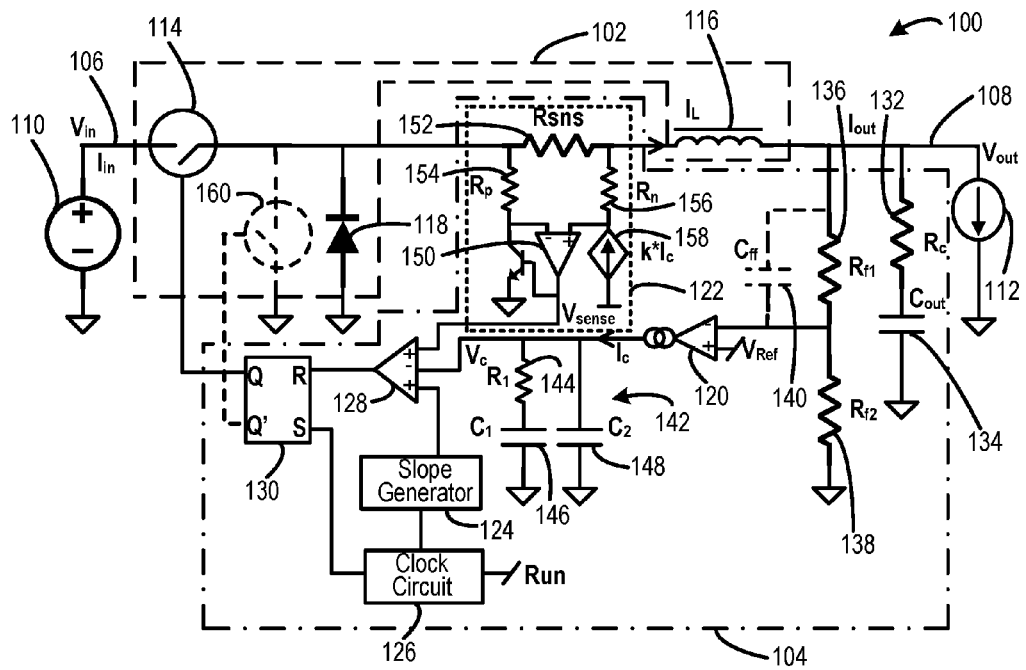
FIG. 1 shows a switching power regulator circuit including a current-mode controlled Buck power converter.

FIG. 1 shows a switching power regulator circuit 100 including a Buck power converter 102 and a control loop 104 configured to perform peak-current mode control of the Buck power converter 102. The Buck power converter 102 is operatively intermediate an input node 106 and an output node 108. The input node 106 is configured to receive input electrical power from a power source 110, such as a power supply module or a battery. The input electrical power received by the input node 106 has an input voltage $V_{in}$ and an input current $I_{in}$. The output node 108 is configured to output electrical power to a load 112. The output electrical power output by the output node 108 has an output voltage $V_{out}$ and an output current $I_{out}$. Although the load 112 is depicted as a current source, the load 112 may represent any suitable electrical component(s) configured to consume electrical power, such as a microprocessor, a memory chip, and a display panel, which can be found in a computing device, a smartphone, a wearable device, a head-mounted display device, and other electronic devices.

The Buck power converter 102 is configured to regulate the output voltage $V_{out}$ of the output node 108. The Buck power converter 102 includes a switch 114, an inductor 116, and a diode 118 (and/or optionally another switch 160 to form a synchronous pulse width modulation (PWM) switch). In particular, the current-mode controlled Buck power converter 102 is configured to decrease (i.e., step down) the voltage while increasing (i.e., stepping up) the current from the input node 106 to the output node 108.

The control loop 104 is operatively connected to the switch 114 (and optionally to switch 160) and the output node 108. The control loop 104 includes an error amplifier 120, a current sensing block 122, a slope compensation generator 124, a clock circuit 126, a comparator 128, and a switching block 130.

The control loop further includes an equivalent series resistance (ESR) resistor 132, an output capacitor 134, and feedback resistors 136 and 138. The ESR resistor 132 is operatively intermediate the output node 108 and the output capacitor 134. The ESR resistor 132 and the output capacitor 134 are collectively connected in parallel to the load 112. The ESR resistor 132 has a resistance $R_c$. The output capacitor 134 has a capacitance $C_{out}$. The feedback resistors 136 and 138 are operatively intermediate the output node 108 and the error amplifier 120 such that the feedback resistors 136 and 138 collectively form a voltage divider. The output voltage $V_{out}$ is fed back from the output node 108, across the voltage divider formed by the feedback resistors 136 and 138, to the error amplifier 120. The feedback resistors 136 and 138 have respective resistances $R_{f1}$ and $R_{f2}$. In some implementations, the feedback resistors 136 and 138 may be tunable to vary the output voltage and/or influence a transfer function that characterizes operation of the current-mode controlled Buck power converter 102.

In some implementations, a feed-forward capacitor 140 may be operatively intermediate the output node 108 and the error amplifier 120. The feed-forward capacitor 140 has a capacitance $C_{ff}$. The capacitance $C_{ff}$ of the feed-forward capacitor may be picked together with the feedback resistor values $R_{f1}$ and $R_{f2}$ to introduce a phase Boost at a cross over frequency of the Buck power converter 102 to compensate for a pole of the transfer function that characterizes operation of the Buck power converter 102.

The error amplifier 120 is operatively intermediate the output node 108 and the comparator 128. More particularly, an input of the error amplifier 120 is operatively connected between the feedback resistors 136 and 138. The error amplifier 120 is configured to output an error current $I_c$ based on the difference between output voltage $V_{out}$ and a reference voltage $V_{Ref}$. The reference voltage $V_{Ref}$ may be any suitable fixed value of the switching power regulator circuit 100. For example, the reference voltage $V_{Ref}$ may be derived from a temperature independent voltage of the circuit, such as a bandgap voltage of the switching power regulator circuit 100.

A compensation resistor-capacitor network 142 is operatively intermediate the error amplifier 120 and the comparator 128. The compensation resistor-capacitor network 142 may include a compensation resistor 144 connected in series with a first compensation capacitor 146. The compensation resistor 144 and the first compensation capacitor 146 are collectively connected in parallel with a second compensation capacitor 148. The compensation resistor 144 has a resistance $R_1$, the compensation capacitor 146 has a capacitance $C_1$, and the second compensation capacitor 148 has a capacitance $C_2$. The compensation resistor-capacitor network 142 may be configured in different ways than the abovementioned configuration. Nevertheless, the fundamental role of the compensation network is to provide suitable gain and leading phase to the transfer function that characterizes operation of the control loop 104, for a particular value of the gain of the error amplifier 120.

The current sensing block 122 is operatively connected between the power converter 102 and the comparator 128. The current sensing block 122 is configured to output a sensed voltage $V_{sense}$ that is based on a sensed inductor current $I_L$ of the inductor 116 of the power converter 102 and further based on a mirror 158 of the error current $I_c$ output by the error amplifier 120. The current sensing block 122 includes a current sensing amplifier 150, a sensing resistor 152, biasing resistors 154 and 156, and the mirror 158 of the error current $I_c$. The sensing resistor 152 has a resistance $R_{sns}$, the biasing resistor 154 has a resistance $R_p$, and the biasing resistor 156 has a resistance $R_n$. The sensing resistor 152 is operatively intermediate the switch 114 and the inductor 116. The inductor current $I_L$ is sensed across the sensing resistor 152 and fed into the current sensing amplifier 150.

The depicted current sensing block is provided as a non-limiting example. Other configurations of the current sensing block 122 are contemplated. For example, the current sensing block may be configured to sense a current of the switch 114. In another example, the current sensing block may be configured to directly sense a current across the inductor 116 via a direct current resistance (DCR) sensing resistor/capacitor (R/C) network. The current sensing amplifier is further configured to receive the mirror 158 of the error current $I_c$ that is adjusted by a gain k. The factor k is a parameter to control an effect of current injection provided by the mirror 158. In some implementations, the factor k may be tunable by a manufacturer and/or users as desired according to design requirements of the circuit. Also the total value of the injected current $k*I_c$ may be less than a pre-defined maximum sensed current (e.g., $V_{sense\_max}$) of the current sensing amplifier 150. According to such an arrangement, the sensed inductor current $I_L$ is modified by the mirror 158 of the error current $k*I_c$ as the error amplifier 120 responds to a load transient caused by a demand change of the load 112, to produce a relationship where $$I_{sense} = \frac{I_L * R_{sns} - k * I_c * R_n}{R_p}$$

Figure 5:
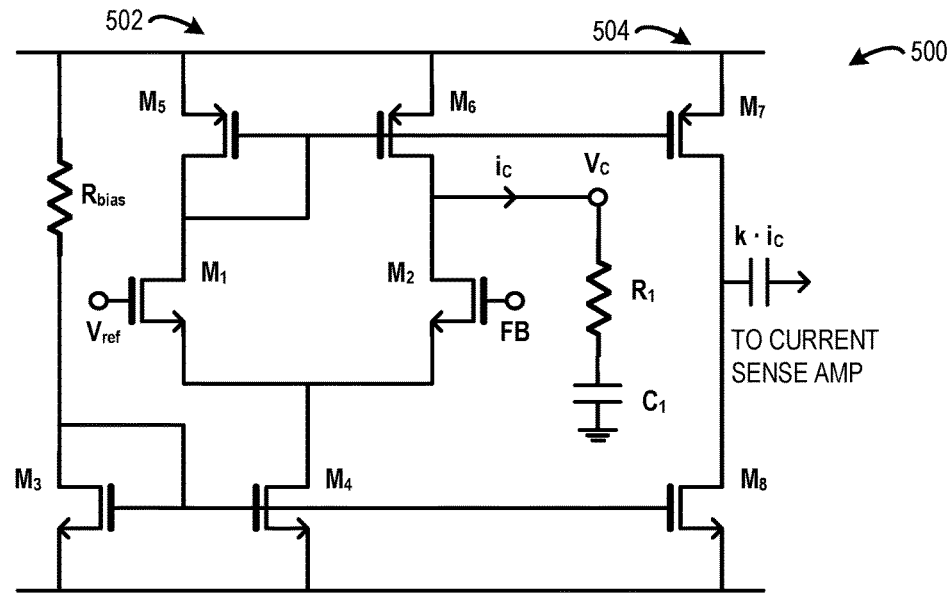
FIG. 5 shows a circuit configured to mirror an error current output by an error amplifier of a control loop of a power regulator circuit.

The mirror 158 of the error current can be implemented through different approaches. In one example, the mirrored error current $k*I_c$ is achieved by appropriately sizing transistors M7/M8 which mirror the output branch of an operational transconductance amplifier (OTA) as shown in FIG. 5 and discussed in further detail below. In another example, the error current $I_c$ output from the error amplifier can be mirrored by sensing a voltage drop across the compensation resistor $R_1$. It will be appreciated that the mirror 158 of the error current $I_c$ may take any suitable form.

The comparator 128 is operatively connected between the switching block 130 and the current sensing block 122, the error amplifier 120, and the slope compensation generator 124. The comparator 128 is configured to compare an output voltage of the compensation network 142 to the output voltage of current sensing amplifier 150. The comparator 128 is further configured to receive a slope compensation signal output by the slope compensation generator 124. The comparator 128 is configured to output a control current based on a sensed current received from the current sensing block 122, the error current received from the error amplifier 120, and the slope compensation signal received from the slope compensation generator 124.

The slope compensation generator 124 is operatively connected between the clock circuit 126 and the comparator 128. The slope compensation generator 124 is configured to output a slope compensation signal based on a clock signal received from the clock circuit 126.

The switching block 130 is operatively connected between the switch 114 and the comparator 128. The switching block 130 is further operatively connected to the clock circuit 126. The switching block 130 is configured to control operation of the switch 114 based on the control current output by the comparator 128 and the clock signal output by the clock circuit 126.

In the depicted implementation, the switching block 130 includes a set-reset latch. The output of the clock circuit 126 is operatively connected to a set input of the set-reset latch, the output of the comparator 128 is operatively connected to a reset input of the set-reset latch, and a primary output of the set-reset latch is operatively connected to the switch 114. The output of the switching block 130 is PWM modulated based on the load 112 requirement. It will be appreciated that the switching block 130 may include any suitable type of flip flop, latch, or other logic component to control the state of the switch 114 based on the output of the comparator 128 and the clock signal output by clock circuit 126.

In some implementations, the power converter 102 may alternatively or additionally include a second switch 160 operatively connected intermediate the switch 114 and the diode 118. A complementary output of the set-reset latch may be operatively connected to the second switch 160 to control a state of the second switch 160.

Figure 2:
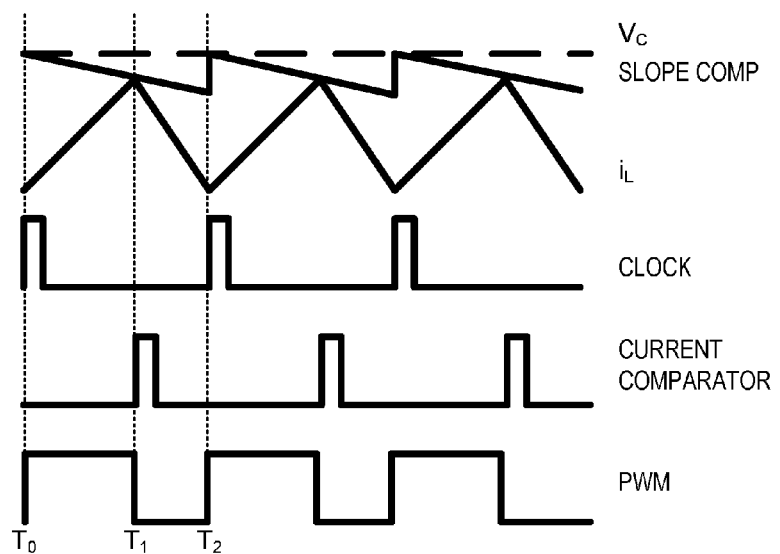
FIG. 2 shows a timing chart of operational waveforms of peak-current pulse width modulation (PWM) control of FIG. 1.

FIG. 2 shows a timing chart of operational waveforms of the power regulator circuit 100 of FIG. 1. Beginning with the switch 114 open (off-state), the current flowing through the circuit 100 is zero. Starting at time $T_0$ with the set pulse of the clock circuit 126, the switch 114 is first closed (on-state), and the inductor current $I_L$ begins to increase. The inductor 116 produces an opposing voltage across its terminals in response to the changing current. This voltage drop counteracts the voltage of the power source 110, and therefore reduces the net voltage across the load 112. The inductor current $I_L$ increases until a value of the output by the current sensing amplifier 150 equals a sum of the error amplifier 120 output and the slope compensation signal output by the slope compensation generator 124. Then, at time $T_1$, the comparator 128 generates the pulse to reset the set-reset latch 130, which accordingly turns off the switch 114, and the inductor current $I_L$ follows the command to decrease until the next clock pulse comes at time T2, to set another period of operation. In this way, the switch 114 is controlled according to a pulse-width-modulation PWM scheme. The PWM Switching occurs between the on-state and the off-state at the frequency of the clock circuit 126.

As described above, a traditional peak-current control method that does not take advantage of a mirrored error current governs the peak value of the inductor 116 current to follow the output $V_c$ of error amplifier 120. In the circuit 100, the transient response of the Buck power converter 102 is sped up by injecting the mirror 158 of the error current $I_c$ output by the error amplifier 120 into the current sensing block 122 to manipulate the real-time sensed inductor current $I_L$. In other words, the manipulation of the sensed inductor current $I_L$ by the mirror 158 of the error current "tricks" the control loop into providing a faster response by not waiting for the effects of the actual sensed inductor current $I_L$ to flow through the Buck power converter 102 and be fed back through the control loop 104 via the error amplifier 120.

Although the arrangement of the control loop 104 that takes advantage of the mirror 158 of the error current is described in terms of being used to speed up a transient response of a Buck power converter 102, such an arrangement may be advantageously employed to speed of the transient responses of power regulator circuits that include other types of power converter topologies.

Figure 3:
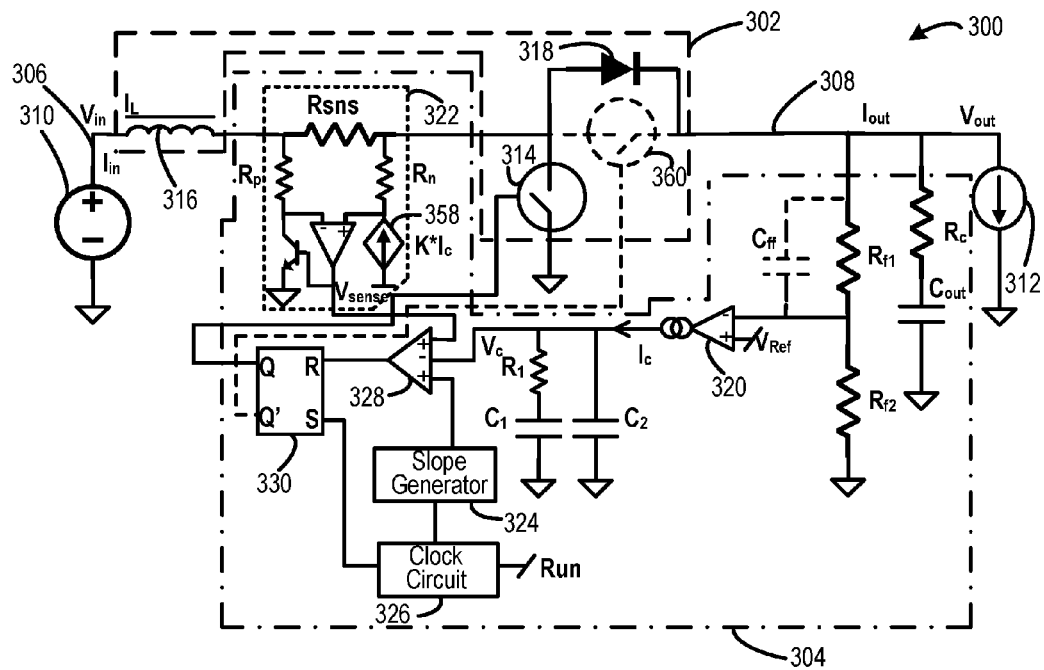
FIG. 3 shows a switching power regulator circuit including a current-mode controlled Boost converter.

FIG. 3 shows a power regulator circuit 300 including a current-mode controlled Boost power converter 302. Components of the power regulator circuit 300 that may be substantially the same as those of the power regulator circuit 100 are identified in the same way and are described no further. However, it will be noted that components identified in the same way in different implementations of the present disclosure may be at least partly different.

The Boost power converter 302 is operatively intermediate an input node 306 and an output node 308. The input node 306 is configured to receive input electrical power from a power source 310, such as a power supply module or a battery. The input electrical power received by the input node 306 has an input voltage $V_{in}$ and an input current $I_{in}$. The output node 308 is configured to output electrical power to a load 312. The output electrical power output by the output node 308 has an output voltage $V_{out}$ and an output current $I_{out}$.

The Boost power converter 302 is configured to regulate the output voltage $V_{out}$ of the output node 308. The Boost power converter 302 includes a switch 314, an inductor 316, and a diode 318 (and/or optionally another switch 360 to form a synchronous PWM switch). In particular, the current-mode controlled Boost power converter 302 is configured to increase (i.e., step up) the voltage while decreasing (i.e., stepping down) the current from the input node 306 to the output node 308.

A control loop 304 is operatively connected to the switch 314 and the output node 308. The control loop 304 includes an error amplifier 320, a current sensing block 322, a slope compensation generator 324, a clock circuit 326, a comparator 328, and a switching block 330. The control loop 304 is configured to switch the Boost power convert 302 between the on-state and the off-state via the operation of the switch 314. Like the control loop 104 of FIG. 1, the control loop 304 manipulates a sensed current $V_{sense}$ output by the current sensing block 322 via a mirror 358 of the error current $I_c$ output by the error amplifier 320 during transient loads in order to speed up a transient response of the Boost power converter 302.

The arrangement of the Boost power converter 302 in relation to the control loop 304 differs from the arrangement of the Buck power converter 102 relative to the control loop 104 of FIG. 1. In particular, the inductor 316 is operatively intermediate the input node 306 and the current sensing block 322. The current sensing block 322 is operatively intermediate the inductor 316 and the switch 314. The switch 314 is operatively intermediate the current sensing block 322 and the output node 308. The diode 318 is operatively intermediate the current sensing block 322 and the output node 308.

Figure 4:
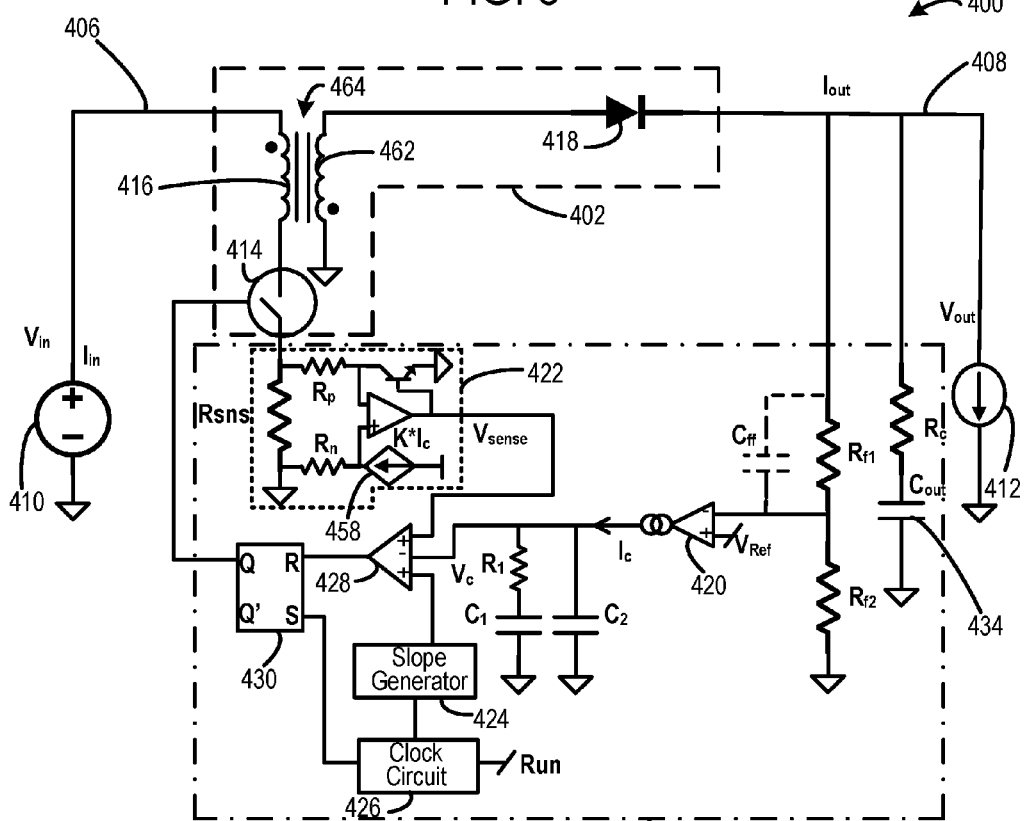
FIG. 4 shows a switching power regulator circuit including a current-mode controlled Flyback converter.

FIG. 4 shows a power regulator circuit 400 including a current-mode controlled Flyback power converter 402. Components of the power regulator circuit 400 that may be substantially the same as those of the power regulator circuits 100 and 300 are identified in the same way and are described no further. However, it will be noted that components identified in the same way in different implementations of the present disclosure may be at least partly different.

The Flyback power converter 402 is operatively intermediate an input node 406 and an output node 408. The input node 406 is configured to receive input electrical power from a power source 410, such as a power supply module or a battery. The input electrical power received by the input node 406 has an input voltage $V_{in}$ and an input current $I_{in}$. The output node 408 is configured to output electrical power to a load 412. The output electrical power output by the output node 408 has an output voltage $V_{out}$ and an output current $I_{out}$.

The Flyback power converter 402 is configured to regulate the output voltage $V_{out}$ of the output node 408. The Flyback power converter 402 includes a switch 414, a first inductor 416 and a second inductor 462 that collectively form a transformer 464, and a diode 418. The current-mode controlled Flyback power converter 402 is configured to vary a magnitude of an output voltage relative to a magnitude of an input voltage. In particular, when the switch 414 is closed during an on mode, the first inductor 416 of the transformer 464 is directly connected to the power source 410, and the current and the magnetic flux in the transformer 464 increases, storing energy in the transformer 464. Further, the voltage induced in the second inductor 462 is negative, so the diode 418 is reverse-biased (i.e., blocked), and an output capacitor 434 supplies energy to the load 412. When the switch 414 is opened during an off mode, the current and magnetic flux drops in the transformer 464, and the second inductor voltage becomes positive. This forward-biases the diode 418 to allow current to flow from the transformer 464. The energy from the transformer 464 recharges the capacitor 434 and supplies the load 412.

A control loop 404 is operatively connected to the switch 414 and the output node 408. The control loop 404 includes an error amplifier 420, a current sensing block 422, a slope compensation generator 424, a clock circuit 426, a comparator 428, and a switching block 430. The control loop 404 is configured to switch the Flyback power convert 402 between the on-state and the off-state via the operation of the switch 414. Like the control loop 104 of FIG. 1 and the control loop 304 of FIG. 3, the control loop 404 manipulates a sensed current $V_{sense}$ output by the current sensing block 422 via a mirror 458 of the error current $I_c$ output by the error amplifier 420 during transient loads in order to speed up a transient response of the Flyback power converter 402.

The arrangement of the Flyback power converter 402 in relation to the control loop 404 differs from the arrangement of the Buck power converter 102 relative to the control loop 104 of FIG. 1 and the Boost power converter 302 relative to the control loop 304 of FIG. 3. In particular, the first inductor 416 is operatively intermediate the input node 406 and the switch 414. The switch 414 is operatively intermediate the first inductor 416 and the current sensing block 422. The current sensing block 422 is operatively intermediate the switch 414 and the comparator 428. Further, the second inductor 462 is operatively connected to the diode 418. The diode 418 is operatively intermediate the second inductor 462 and the output node 408.

It will be appreciated that a control loop that takes advantage of a mirror of an error current configured to manipulate a sensed current in order to speed up a transient response of the power converter may be employed to control any suitable power converter topology.

The mirror of the error current can be sensed through different approaches. FIG. 5 shows an example circuit 500 configured to mirror an error current output by an error amplifier of a control loop of a power regulator circuit, such as the power regulator circuit 100 of FIG. 1, the power regulator circuit 300 of FIG. 3 and the power regulator circuit 400 of FIG. 4. The circuit 500 includes an operational transconductance amplifier (OTA) 502 including a plurality of transistors ($M_1$-$M_6$) configured to translate a voltage error into the mirror of the error current $I_c$. The voltage error is the difference of the reference voltage $V_{ref}$ and feedback of the output voltage. Further, the circuit 500 includes a pair of transistors 504 (e.g., $M_7$ and $M_8$) that are sized to mirror the error current $k*I_c$. The circuit 500 is meant to be non-limiting. The mirror of the error current can be provided in any suitable manner.

Figure 6:
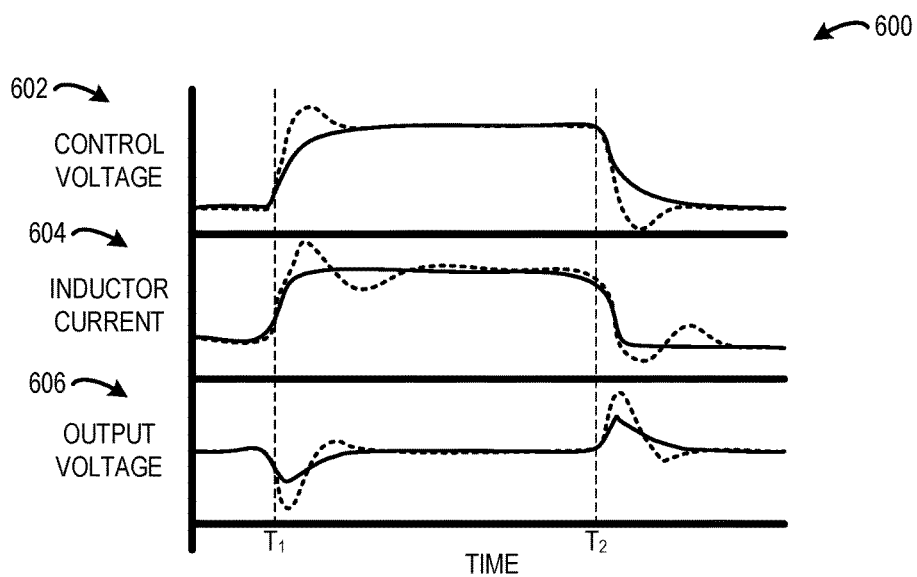
FIG. 6 shows a graph comparing operation of a power regulator circuit having a control loop that is influenced by a mirror of an error current and a power regulator circuit having a control loop that does not include a mirror of an error current.

FIG. 6 shows a graph 600 comparing operation of a power regulator circuit having a control loop that is influenced by a mirror of an error current and a power regulator circuit having a control loop that does not include a mirror of an error current. The two power regulator circuits include current-mode controlled Buck power converters and have the same parameters (e.g., resistors, capacitors, inductor) except for one power regulator circuit does not take advantage of a mirror of the error current in the current sensing block. The graph 600 plots error amplifier 120, 320, 420, output voltage 602 vs time, inductor current 604 vs time, and regulator output voltage 606 vs time. Operation of the power regulator circuit that takes advantage of the mirror of the error current is represented by a solid line in the different comparisons. Operation of the power regulator circuit that does not take advantage of the mirror of the error current is represented by dotted lines. At time $T_1$, a load transient occurs when the load current demand increases at a certain slew rate. Note that the power regulator circuit that takes advantage of the mirror of the error current has a faster transient response (e.g., the control voltage, inductor current, and output voltage reach stead-state) than the power regulator circuit that does not take advantage of the mirror of the error current. At time $T_2$, a load transient occurs when the load current demand decreases at certain slew rate. Again, the power regulator circuit that takes advantage of the mirror of the error current has a faster transient response than the power regulator circuit that does not take advantage of the mirror of the error current. This comparison is meant to be non-limiting. A power regulator circuit that takes advantage of a mirror of an error current may operate in any suitable manner.

In an example, a power regulator circuit comprises an input node configured to receive electrical power; an output node configured to output electrical power having an output voltage and an output current; a power converter operatively intermediate the input node and the output node and configured to regulate the output voltage of the electrical power output from the output node, the power converter including at least a switch and an inductor; and a control loop operatively connected to the switch and the output node and configured to control operation of the power converter. The control loop includes a switching block, a comparator, a clock circuit, a slope compensation generator, a current sensing block, and an error amplifier. The switching block is operatively connected between the switch and the comparator. The switching block is further operatively connected to the clock circuit. The switching block is configured to control operation of the switch based on a reset pulse output by the comparator and a clock signal output by the clock circuit. The comparator is operatively connected between the switching block and the current sensing block, the error amplifier, and the slope compensation generator. The comparator is configured to output the reset pulse based on a sensed current received from the current sensing block, an error voltage received from the error amplifier, and a slope compensation signal received from the slope compensation generator. The slope compensation generator is operatively connected between the clock circuit and the comparator. The slope compensation generator is configured to output the slope compensation signal based on the clock signal received from the clock circuit. The error amplifier is operatively connected between the output node and the comparator. The error amplifier is configured to output the error voltage based on the output voltage received from the output node and a reference voltage. The current sensing block is operatively connected between the power converter and the comparator. The current sensing block is configured to output the sensed current based on a sensed inductor current of the inductor of the power converter and a mirror of an error current corresponding to the error voltage output by the error amplifier. In this example and/or other examples, the current sensing block may include a current sensing amplifier configured to receive the sensed inductor current and the mirror of the error current and output the sensed current based on a combination of the sensed inductor current and the mirror of the error current, and the sensed inductor current may be modified by the mirror of the error current, during a load transient caused by a state change of the switch. In this example and/or other examples, the switching block may include a pulse width modulated signal latch operatively connected to the switch, and the pulse width modulated signal latch may be configured to be set by the clock signal and reset by the reset pulse output of the comparator. In this example and/or other examples, the power converter may be a current-mode controlled Buck converter. In this example and/or other examples, the switch may be operatively intermediate the input node and the current sensing block, the current sensing block may be operatively intermediate the switch and the inductor, and the inductor may be operatively intermediate the current sensing block and the output node. In this example and/or other examples, the power converter may be a current-mode controlled Boost converter. In this example and/or other examples, the inductor may be operatively intermediate the input node and the current sensing block, the current sensing block may be operatively intermediate the inductor and the switch, and the switch may be operatively intermediate the current sensing block and the output node. In this example and/or other examples, the power converter is a current-mode controlled Flyback converter. In this example and/or other examples, the inductor may be a first inductor, the current-mode controlled Flyback converter further may include a second inductor, the first inductor and the second inductor may form a transformer, the first inductor may be operatively intermediate the input node and the switch, the switch may be operatively intermediate the first inductor and the current sensing block, and the current sensing block maybe operatively intermediate the switch and the comparator. In this example and/or other examples, the power regulator circuit may further comprise a feed-forward capacitor operatively intermediate the output node and the error amplifier. In this example and/or other examples, the control loop may include a resistor-capacitor network operatively intermediate the error amplifier and the comparator, and the mirror of the error current may be provided based on sensing a voltage drop across a resistor of the resistor-capacitor network. In this example and/or other examples, the mirror of the error current may be produced by an operational transconductance amplifier circuit including a plurality of transistors configured to translate a voltage error between a reference voltage and the output voltage of the output node to the mirror of the error current.

In an example, a power regulator circuit comprises an input node configured to receive electrical power; an output node configured to output electrical power having an output voltage and an output current; a power converter operatively intermediate the input node and the output node and configured to regulate the output voltage of the electrical power output from the output node, the power converter including at least a switch and an inductor, and a control loop operatively connected to the switch and the output node and configured to control operation of the power converter. The control loop includes a switching block, a comparator, a current sensing block, a clock circuit, and an error amplifier. The switching block is operatively connected between the switch and the comparator. The switching block is configured to control operation of the switch based on a reset pulse output by the comparator and a clock signal output by the clock circuit. The comparator is operatively connected between the switching block and the current sensing block, and the error amplifier. The comparator is configured to output the reset pulse based on a sensed current received from the current sensing block and an error voltage received from the error amplifier. The current sensing block includes a current sensing amplifier configured to receive a sensed inductor current of the inductor and a mirror of an error current corresponding to the error voltage output by the error amplifier and output the sensed current. The sensed inductor current is modified by the mirror of the error current during a load transient caused by a state change of the switch. In this example and/or other examples, the power converter may be a current-mode controlled Buck converter. In this example and/or other examples, the switch may be operatively intermediate the input node and the current sensing block, the current sensing block may be operatively intermediate the switch and the inductor, and the inductor may be operatively intermediate the current sensing block and the output node. In this example and/or other examples, the power converter may be a current-mode controlled Boost converter. In this example and/or other examples, the inductor may be operatively intermediate the input node and the current sensing block, the current sensing block may be operatively intermediate the inductor and the switch, and the switch may be operatively intermediate the current sensing block and the output node. In this example and/or other examples, the power converter may be a current-mode controlled Flyback converter. In this example and/or other examples, the inductor may be a first inductor, the current-mode controlled Flyback converter may further include a second inductor, the first inductor and the second inductor may form a transformer, the first inductor may be operatively intermediate the input node and the switch, the switch may be operatively intermediate the first inductor and the current sensing block, the current sensing block may be operatively intermediate the switch and the comparator.

In an example, a power regulator circuit comprises an input node configured to receive electrical power; an output node configured to output electrical power having an output voltage and an output current; a current-mode controlled Buck converter operatively intermediate the input node and the output node and configured to regulate the output voltage of the electrical power output from the output node; the current-mode controlled Buck converter including at least a switch and an inductor; and a control loop operatively connected to the switch and the output node, the control loop configured to control operation of the current-mode controlled Buck converter, the control loop including a switching block, a comparator, a clock circuit, a slope compensation generator, a current sensing block, and an error amplifier. The switching block is operatively connected between the switch and the comparator. The switching block is further operatively connected to the clock circuit. The switching block is configured to control operation of the switch based on a reset pulse output by the comparator and a clock signal output by the clock circuit. The comparator is operatively connected between the switching block and the current sensing block, and the slope compensation generator. The comparator is configured to output the reset pulse based on a sensed current received from the current sensing block, an error voltage received from the error amplifier, and a slope compensation signal received from the slope compensation generator. The slope compensation generator is operatively connected between the clock circuit and the comparator. The slope compensation generator is configured to output the slope compensation signal based on the clock signal received from the clock circuit. The error amplifier is operatively connected between the output node and the comparator. The error amplifier is configured to output the error voltage based on the output voltage received from the output node and a reference voltage. The current sensing block is operatively connected between the current-mode controlled Buck converter and the comparator. The current sensing block is configured to output the sensed current based on a sensed inductor current of the inductor of the current-mode controlled Buck converter and a mirror of an error current corresponding to the error voltage output by the error amplifier. The switch is operatively intermediate the input node and the current sensing block. The current sensing block is operatively intermediate the switch and the inductor. The inductor is operatively intermediate the current sensing block and the output node.

It will be understood that the configurations and/or approaches described herein are exemplary in nature, and that these specific embodiments or examples are not to be considered in a limiting sense, because numerous variations are possible. The specific routines or methods described herein may represent one or more of any number of processing strategies. As such, various acts illustrated and/or described may be performed in the sequence illustrated and/or described, in other sequences, in parallel, or omitted. Likewise, the order of the above-described processes may be changed.

The subject matter of the present disclosure includes all novel and nonobvious combinations and subcombinations of the various processes, systems and configurations, and other features, functions, acts, and/or properties disclosed herein, as well as any and all equivalents thereof.

The invention claimed is:

1. A power regulator circuit comprising:
an input node configured to receive electrical power;
an output node configured to output electrical power having an output voltage and an output current;
a power converter operatively intermediate the input node and the output node and configured to regulate the output voltage of the electrical power output from the output node, the power converter including at least a switch and an inductor; and
a control loop operatively connected to the switch and the output node, the control loop configured to control operation of the power converter, the control loop including a switching block, a comparator, a clock circuit, a slope compensation generator, a current sensing block, and an error amplifier;
wherein the switching block is operatively connected between the switch and the comparator, wherein the switching block is further operatively connected to the clock circuit, and wherein the switching block is configured to control operation of the switch based on a reset pulse output by the comparator and a clock signal output by the clock circuit;
wherein the comparator is operatively connected between the switching block and the current sensing block, the error amplifier, and the slope compensation generator, wherein the comparator is configured to output the reset pulse based on a sensed current received from the current sensing block, an error voltage received from the error amplifier, and a slope compensation signal received from the slope compensation generator;
wherein the slope compensation generator is operatively connected between the clock circuit and the comparator, and wherein the slope compensation generator is configured to output the slope compensation signal based on the clock signal received from the clock circuit;
wherein the error amplifier is operatively connected between the output node and the comparator, and wherein the error amplifier is configured to output the error voltage based on the output voltage received from the output node and a reference voltage; and
wherein the current sensing block is operatively connected between the power converter and the comparator, and wherein the current sensing block is configured to output the sensed current based on a sensed inductor current of the inductor of the power converter and a mirror of an error current corresponding to the error voltage output by the error amplifier.

2. The power regulator of claim 1, wherein the current sensing block includes a current sensing amplifier configured to receive the sensed inductor current and the mirror of the error current and output the sensed current based on a combination of the sensed inductor current and the mirror of the error current, and wherein the sensed inductor current is modified by the mirror of the error current, during a load transient caused by a state change of the switch.

3. The power regulator circuit of claim 1, wherein the switching block includes a pulse width modulated signal latch operatively connected to the switch, and wherein the pulse width modulated signal latch is configured to be set by the clock signal and reset by the reset pulse output of the comparator.

4. The power regulator circuit of claim 1, wherein the power converter is a current-mode controlled Buck converter.

5. The power regulator circuit of claim 4, wherein the switch is operatively intermediate the input node and the current sensing block, wherein the current sensing block is operatively intermediate the switch and the inductor, and wherein the inductor is operatively intermediate the current sensing block and the output node.

6. The power regulator circuit of claim 1, wherein the power converter is a current-mode controlled Boost converter.

7. The power regulator circuit of claim 6, wherein the inductor is operatively intermediate the input node and the current sensing block, wherein the current sensing block is operatively intermediate the inductor and the switch, and wherein the switch is operatively intermediate the current sensing block and the output node.

8. The power regulator circuit of claim 1, wherein the power converter is a current-mode controlled Flyback converter.

9. The power regulator circuit of claim 8, wherein the inductor is a first inductor, wherein the current-mode controlled Flyback converter further includes a second inductor, wherein the first inductor and the second inductor form a transformer, wherein the first inductor is operatively intermediate the input node and the switch, wherein the switch is operatively intermediate the first inductor and the current sensing block, and wherein the current sensing block is operatively intermediate the switch and the comparator.

10. The power regulator circuit of claim 1, further comprising:
a feed-forward capacitor operatively intermediate the output node and the error amplifier.

11. The power regulator circuit of claim 1, wherein the control loop includes a resistor-capacitor network operatively intermediate the error amplifier and the comparator, and wherein the mirror of the error current is provided based on sensing a voltage drop across a resistor of the resistor-capacitor network.

12. The power regulator circuit of claim 1, wherein the mirror of the error current is produced by an operational transconductance amplifier circuit including a plurality of transistors configured to translate a voltage error between a reference voltage and the output voltage of the output node to the mirror of the error current.

13. A power regulator circuit comprising:
an input node configured to receive electrical power;
an output node configured to output electrical power having an output voltage and an output current;
a power converter operatively intermediate the input node and the output node and configured to regulate the output voltage of the electrical power output from the output node, the power converter including at least a switch and an inductor; and
a control loop operatively connected to the switch and the output node, the control loop configured to control operation of the power converter, the control loop including a switching block, a comparator, a current sensing block, a clock circuit, and an error amplifier,
wherein the switching block is operatively connected between the switch and the comparator, wherein the switching block is configured to control operation of the switch based on a reset pulse output by the comparator and a clock signal output by the clock circuit,
wherein the comparator is operatively connected between the switching block and the current sensing block, and the error amplifier, wherein the comparator is configured to output the reset pulse based on a sensed current received from the current sensing block and an error voltage received from the error amplifier,
wherein the current sensing block includes a current sensing amplifier configured to receive a sensed inductor current of the inductor and a mirror of an error current corresponding to the error voltage output by the error amplifier and output the sensed current, and wherein the sensed inductor current is modified by the mirror of the error current during a load transient caused by a state change of the switch.

14. The power regulator circuit of claim 13, wherein the power converter is a current-mode controlled Buck converter.

15. The power regulator circuit of claim 14, wherein the switch is operatively intermediate the input node and the current sensing block, wherein the current sensing block is operatively intermediate the switch and the inductor, and wherein the inductor is operatively intermediate the current sensing block and the output node.

16. The power regulator circuit of claim 13, wherein the power converter is a current-mode controlled Boost converter.

17. The power regulator circuit of claim 16, wherein the inductor is operatively intermediate the input node and the current sensing block, wherein the current sensing block is operatively intermediate the inductor and the switch, and wherein the switch is operatively intermediate the current sensing block and the output node.

18. The power regulator circuit of claim 13, wherein the power converter is a current-mode controlled Flyback converter.

19. The power regulator circuit of claim 18, wherein the inductor is a first inductor, wherein the current-mode controlled Flyback converter further includes a second inductor, wherein the first inductor and the second inductor form a transformer, wherein the first inductor is operatively intermediate the input node and the switch, wherein the switch is operatively intermediate the first inductor and the current sensing block, and wherein the current sensing block is operatively intermediate the switch and the comparator.

20. A power regulator circuit comprising:
an input node configured to receive electrical power;
an output node configured to output electrical power having an output voltage and an output current;
a current-mode controlled Buck converter operatively intermediate the input node and the output node and configured to regulate the output voltage of the electrical power output from the output node, the current-mode controlled Buck converter including at least a switch and an inductor; and
a control loop operatively connected to the switch and the output node, the control loop configured to control operation of the current-mode controlled Buck converter, the control loop including a switching block, a comparator, a clock circuit, a slope compensation generator, a current sensing block, and an error amplifier,
wherein the switching block is operatively connected between the switch and the comparator, wherein the switching block is further operatively connected to the clock circuit, and wherein the switching block is configured to control operation of the switch based on a reset pulse output by the comparator and a clock signal output by the clock circuit;
wherein the comparator is operatively connected between the switching block and the current sensing block, the error amplifier, and the slope compensation generator, wherein the comparator is configured to output the reset pulse based on a sensed current received from the current sensing block, an error voltage received from the error amplifier, and a slope compensation signal received from the slope compensation generator;
wherein the slope compensation generator is operatively connected between the clock circuit and the comparator, and wherein the slope compensation generator is configured to output the slope compensation signal based on the clock signal received from the clock circuit;
wherein the error amplifier is operatively connected between the output node and the comparator, and wherein the error amplifier is configured to output the error voltage based on the output voltage received from the output node and a reference voltage;
wherein the current sensing block is operatively connected between the current-mode controlled Buck converter and the comparator, and wherein the current sensing block is configured to output the sensed current based on a sensed inductor current of the inductor of the current-mode controlled Buck converter and a mirror of an error current corresponding to the error voltage output by the error amplifier; and
wherein the switch is operatively intermediate the input node and the current sensing block, wherein the current sensing block is operatively intermediate the switch and the inductor, and wherein the inductor is operatively intermediate the current sensing block and the output node.

* * * * *